US006928408B1

(12) United States Patent
Matsumoto

(10) Patent No.: US 6,928,408 B1
(45) Date of Patent: Aug. 9, 2005

(54) SPEECH DATA COMPRESSION/EXPANSION APPARATUS AND METHOD

(75) Inventor: Chikako Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 879 days.

(21) Appl. No.: 09/722,522

(22) Filed: Nov. 28, 2000

(30) Foreign Application Priority Data

Dec. 3, 1999 (JP) ................................ 11-344615

(51) Int. Cl.[7] .............................................. G10L 15/04

(52) U.S. Cl. ...................... 704/254; 704/258; 704/221; 704/222

(58) Field of Search ................................ 704/254, 220, 704/219, 222, 221, 258

(56) References Cited

U.S. PATENT DOCUMENTS 5,396,576 A * 3/1995 Miki et al. .................. 704/222
5,717,818 A 2/1998 Nejime et al.
5,899,968 A * 5/1999 Navarro et al. ............. 704/220
6,055,496 A * 4/2000 Heidari et al. .............. 704/222
6,311,154 B1 * 10/2001 Gersho et al. .............. 704/219
6,480,822 B2 * 11/2002 Thyssen ..................... 704/220

FOREIGN PATENT DOCUMENTS

JP 7-129190 5/1995
JP 10-74095 3/1998
JP 10-307581 11/1998

* cited by examiner

*Primary Examiner*—Vijay B. Chawan
(74) *Attorney, Agent, or Firm*—Staas & Halsey LLP

(57) ABSTRACT

Speech data containing waveform data is extracted from an existing speech waveform dictionary and input. A part used for speech synthesis in the waveform data is specified, and a starting point and an ending point for compression are set before and after the part. The waveform data is compressed with respect to a compression interval specified by the starting point and the ending point for compression. The compressed waveform data is expanded, and the compression interval, in which an expansion result of the compressed waveform data has highest quality, is determined as a compression/expansion position. The compressed waveform data, and the starting point and the ending point for compression are registered in a database as waveform data used for speech synthesis.

19 Claims, 9 Drawing Sheets

SPEECH DATA COMPRESSION/EXPANSION APPARATUS AND METHOD

BACKGROUND OF THE INVENTION

1. Field of the Invention

The present invention relates to a compression apparatus for compressing waveform dictionary data composed of speech waveform data used for speech synthesis to create a compressed dictionary, and an expansion apparatus for expanding compressed data of the compressed dictionary.

2. Description of the Related Art

Due to the recent rapid development of computer technology, speech synthesis technology, of which use has conventionally been limited to the particular field, is becoming applicable to various fields. Along with this, there is an increasing demand for high quality speech reproduction in speech synthesis.

In order to realize high quality speech synthesis, it is required to prepare a large amount of sound waveform data that is a relatively large capacity of data, which results in large consumption of computer resources such as a storage device (e.g., a disk). Thus, various methods for compressing such sound waveform data have been considered.

For example, FIG. 1 is a view showing the principle of a compression/expansion apparatus that has often been used. In FIG. 1, reference numeral 11 denotes a dictionary data input part, 12 denotes a dictionary data compression part, 13 denotes a compressed dictionary data storing part, 14 denotes a speech dictionary database, 15 denotes a dictionary data expansion part, and 16 denotes an expanded waveform data output part.

In FIG. 1, the dictionary data is composed of waveform data 111, a phoneme label, and pitch information 113. In such a conventional compression/expansion apparatus, only the waveform data 111 is compressed and expanded. Thus, in the dictionary data compression part 12, the input waveform data 111 is compressed, and stored in the speech dictionary database 14 by the compressed dictionary data storing part 13.

The compressed waveform data stored in the speech dictionary database 14 is expanded in the dictionary data expansion part 15 during speech synthesis, and reproduced in the expanded waveform data output part 16.

However, according to the above-mentioned compression/expansion method, conventional waveform data is compressed as it is. Therefore, in the case where waveform data in the original dictionary is not configured in a phoneme unit, but in a corpus unit, it is difficult to determine which portion of the corpus a phoneme or a syllable to be used for speech synthesis corresponds to and it is required to expand all the data compressed in a corpus unit. This requires a considerable period of time for expansion, and makes it difficult to perform speech synthesis in real time.

Furthermore, in the case where compressed speech waveform data is expanded for speech synthesis, an SNR is likely to decrease in a rising portion of speech synthesis, so that it is difficult to perform high quality reproduction.

SUMMARY OF THE INVENTION

Therefore, with the foregoing in mind, it is an object of the present invention to provide a speech data compression/expansion apparatus and method for correcting a compression position and an expansion position in waveform data, thereby ensuring a real time property of speech synthesis and realizing high quality speech synthesis.

In order to achieve the above-mentioned object, a speech data compression/expansion apparatus of the present invention includes: a dictionary data input part for extracting speech data containing waveform data from an existing speech waveform dictionary and inputting the extracted speech data;

a compression position determining part for specifying a part used for speech synthesis in the waveform data, and setting a starting point and an ending point for compression before and after the part;

a dictionary data compression part for compressing the waveform data with respect to a compression interval specified by the starting point and the ending point for compression; and a dictionary data expansion part for expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis.

Because of the above structure, a compression position in the waveform data can be arbitrarily determined, and the capacity of waveform data to be compressed can be minimized to a required capacity. Therefore, an expansion time can be shortened, and a real time property during speech synthesis can be ensured.

Furthermore, in the speech data compression/expansion apparatus of the present invention, it is preferable that, in the compression position determining part, the part used for speech synthesis in the waveform data is specified, and the starting point and the ending point for compression are provisionally set before and after the part. It is also preferable that the apparatus further includes: a dictionary data compression part for compressing the waveform data with respect to the specified compression interval; a dictionary data expansion part for expanding the compressed waveform data; and an SNR calculating part for calculating an SNR with respect to the expanded waveform data, and the specified compression interval, having a highest SNR, is determined as a compression/expansion position, and the compressed waveform data is registered in a database as the waveform data used for speech synthesis.

Because of the above structure, a compression position in the waveform data can be determined based on a position having the highest SNR during speech synthesis, high quality speech synthesis can be performed, and the capacity of waveform data to be compressed can be minimized to a required capacity. Therefore, an expansion time can be shortened, and a real time property of speech synthesis can be ensured.

Furthermore, it is preferable that the speech data compression/expansion apparatus of the present invention further includes an expansion position determining part for setting a starting point and an ending point for expansion before and after the compressed waveform data registered in a database as the waveform data used for speech synthesis. This is because an expansion position in the waveform data can be arbitrarily determined, and high quality speech synthesis can be performed.

Furthermore, it is preferable that, in the compression position determining part, the starting point and the ending point for compression are determined in a pitch unit. Furthermore, it is preferable that, in the compression position determining part, the starting point and the ending point for compression are determined in a frame unit. This is because a starting point and an ending point for compression can be easily specified.

Next, in order to achieve the above-mentioned object, the speech data expansion apparatus of the present invention is characterized in that the waveform data compressed by the above-mentioned speech data compression/expansion apparatus of the present invention stored in a database is expanded.

Because of the above structure, using a database storing compressed waveform data, waveform data having a large population can be held, and appropriate waveform data can be selected therefrom and expanded. Thus, by using a speech data expansion apparatus of the present invention, a speech synthesis apparatus of higher quality can be constituted.

Next, in order to achieve the above object, a speech data compression/expansion apparatus of the present invention includes: a dictionary data input part for extracting speech data containing waveform data from an existing speech waveform dictionary and inputting the extracted speech data; a compression position determining part for specifying a part used for speech synthesis in the waveform data, and determining a compression position containing the part; a dictionary data compression part for compressing the waveform data with respect to the compression position; an expansion position determining part for setting a starting point and an ending point for expansion before and after the compressed waveform data; and a dictionary data expansion part for expanding the compressed waveform data with respect to an expansion interval specified by the starting point and the ending point for expansion, wherein the specified expansion interval, in which an expansion result of the compressed waveform data has highest quality, is determined as an expansion position, and the compressed waveform data, and the starting point and the ending point for expansion are registered in a database as the waveform data used for speech synthesis.

Because of the above structure, an expansion position in the waveform data can be arbitrarily determined, and the capacity of waveform data to be expanded can be minimized to a required capacity. Therefore, an expansion time can be shortened, and a real time property of speech synthesis can be ensured.

Next, in order to achieve the above object, a speech data expansion apparatus of the present invention is characterized in that the waveform data in which the expansion interval is determined by the above-mentioned speech data compression/expansion apparatus of the present invention stored in a database is expanded.

Because of the above structure, using a database storing compressed waveform data, waveform data having a large population can be held, appropriate waveform data can be selected therefrom and expanded, and waveform data having higher expansion quality can be used. Thus, by using a speech data expansion apparatus of the present invention, a speech synthesis apparatus of higher quality can be constituted.

Furthermore, in the speech data compression/expansion apparatus of the present invention, it is preferable that, in the expansion position determining part, the starting point and the ending point for expansion are provisionally set before and after the compressed waveform data. It is also preferable that the apparatus further includes: a dictionary data expansion part for expanding the compressed waveform data with respect to the specified expansion interval; and an SNR calculating part for calculating an SNR with respect to the expanded waveform data, wherein the specified expansion interval, having a highest SNR, is determined as an expansion position. This is because an expansion position in the compressed waveform data can be determined based on a position having a high SNR during speech synthesis, and high quality speech synthesis can be performed.

Furthermore, it is preferable that, in the expansion position determining part, the starting point and the ending point for expansion are determined in a pitch unit. Furthermore, it is preferable that, in the expansion position determining part, the ending point for expansion is determined based on the number of bytes for bit filling and the starting point. This is because a starting point and an ending point for expansion of the compressed waveform data can easily be specified.

Next, in order to achieve the above object, a speech data expansion system of the present invention is characterized in that the waveform data compressed by the above-mentioned speech data compression/expansion apparatus of the present invention stored in a database is expanded.

Because of the above structure, using a database storing compressed waveform data, waveform data having a large population can be held, and appropriate waveform data can be selected therefrom and expanded. Thus, by using a speech data expansion apparatus of the present invention, a speech synthesis apparatus of higher quality can be constituted.

Next, in order to achieve the above object, a speech data expansion system of the present invention is characterized in that the waveform data in which the expansion interval is determined by the above-mentioned speech data compression/expansion apparatus of the present invention stored in a database is expanded.

Because of the above structure, using a database storing compressed waveform data, waveform data having a large population can be held, appropriate waveform data can be selected therefrom and expanded, and waveform data having higher expansion quality can be used. Thus, by using a speech data expansion apparatus of the present invention, a speech synthesis apparatus of higher quality can be constituted.

Furthermore, the present invention is characterized by software executed so as to perform the functions of the above-mentioned speech data compression/expansion apparatus as processing steps of a computer. More specifically, the present invention is characterized by a method including: extracting speech data containing waveform data from an existing speech waveform dictionary and inputting the extracted speech data; specifying a part used for speech synthesis in the waveform data, and setting a starting point and an ending point for compression before and after the part; compressing the waveform data with respect to a compression interval specified by the starting point and the ending point for compression; and expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis. The present invention is also characterized by a computer-readable recording medium storing these operations as a program.

Because of the above structure, the program is loaded onto a computer so as to be executed, whereby a compression position in the waveform data can be arbitrarily determined, and the capacity of the waveform data to be compressed can be minimized to a required capacity. Therefore, a speech data compression/expansion apparatus can be realized, which can shorten an expansion time and ensure a real time property of speech synthesis.

Furthermore, the present invention is characterized by software executed so as to perform the functions of the above-mentioned speech data compression/expansion apparatus as processing steps of a computer. More specifically, the present invention is characterized by a method including: extracting speech data containing waveform data from an existing speech waveform dictionary and inputting the extracted speech data; specifying a part used for speech synthesis in the waveform data, and determining a compression interval including the part; compressing the waveform data with respect to the compression interval; setting a starting point and an ending point for expansion before and after the compressed waveform data; and expanding the compressed waveform data with respect to an expansion interval specified by the starting point and the ending point for expansion, wherein the specified expansion interval, in which an expansion result of the compressed waveform data has highest quality, is determined as an expansion position, and the compressed waveform data, and the starting point and the ending point for expansion are registered in a database as the waveform data used for speech synthesis. The present invention is also characterized by a computer-readable recording medium storing these operations as a program.

Because of the above structure, by loading the program onto a computer so as to be executed, more appropriate waveform data can be selected from waveform data having a large population, so that a speech synthesis apparatus of higher quality can be realized.

These and other advantages of the present invention will become apparent to those skilled in the art upon reading and understanding the following detailed description with reference to the accompanying figures.

DESCRIPTION OF THE PREFERRED EMBODIMENTS

Figure 2:
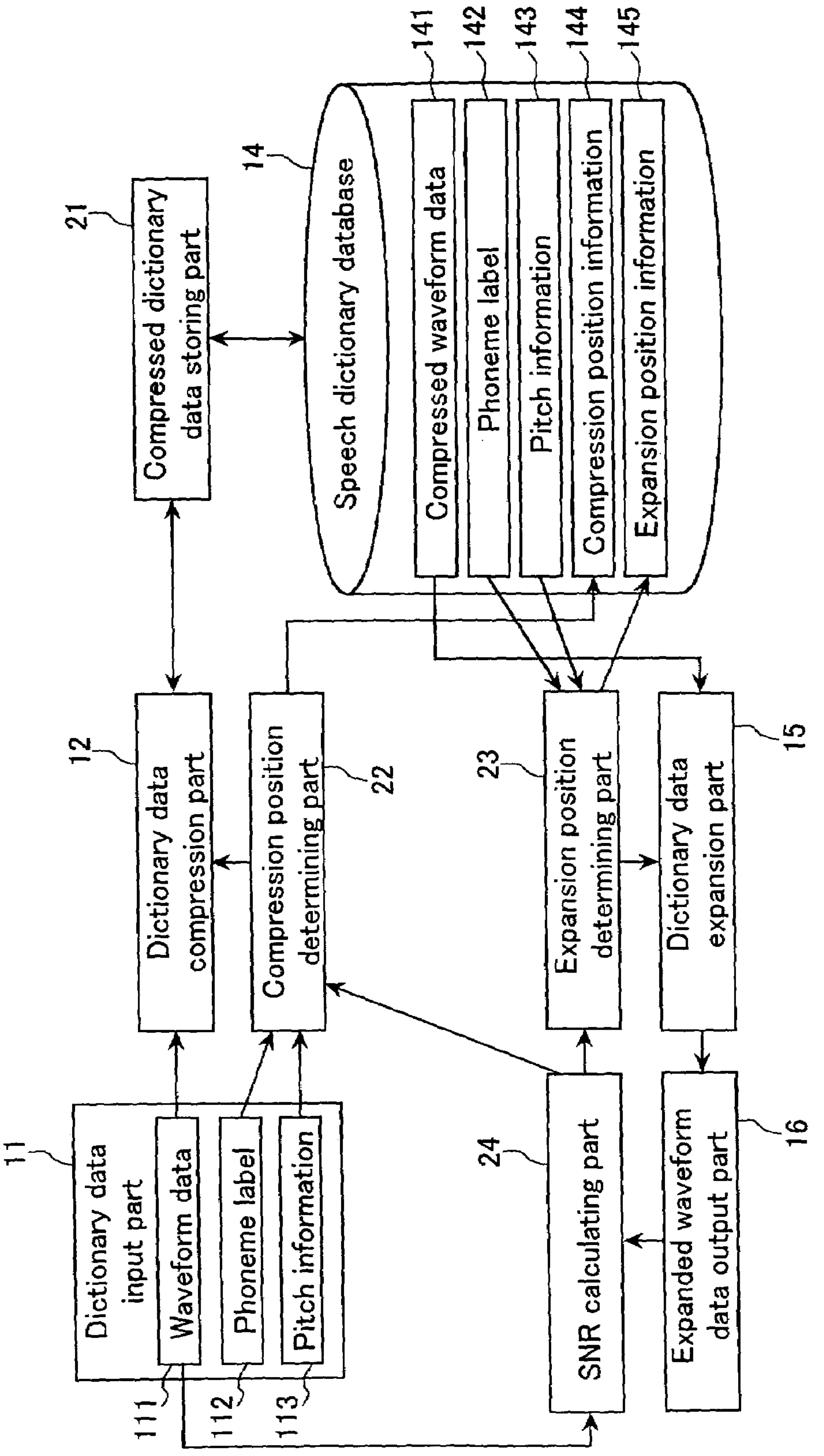
FIG. 2 is a block diagram of a speech data compression/expansion apparatus in an embodiment of the present invention.

Hereinafter, a speech data compression/expansion apparatus in an embodiment of the present invention will be described with reference to the drawings. FIG. 2 is a block diagram showing the principle of the speech data compression/expansion apparatus in the present embodiment. In FIG. 2, reference numeral 21 denotes a compressed dictionary data storing part, 22 denotes a compression position determining part, 23 denotes an expansion position determining part, and 24 denotes an SNR calculating part.

Figure 1:
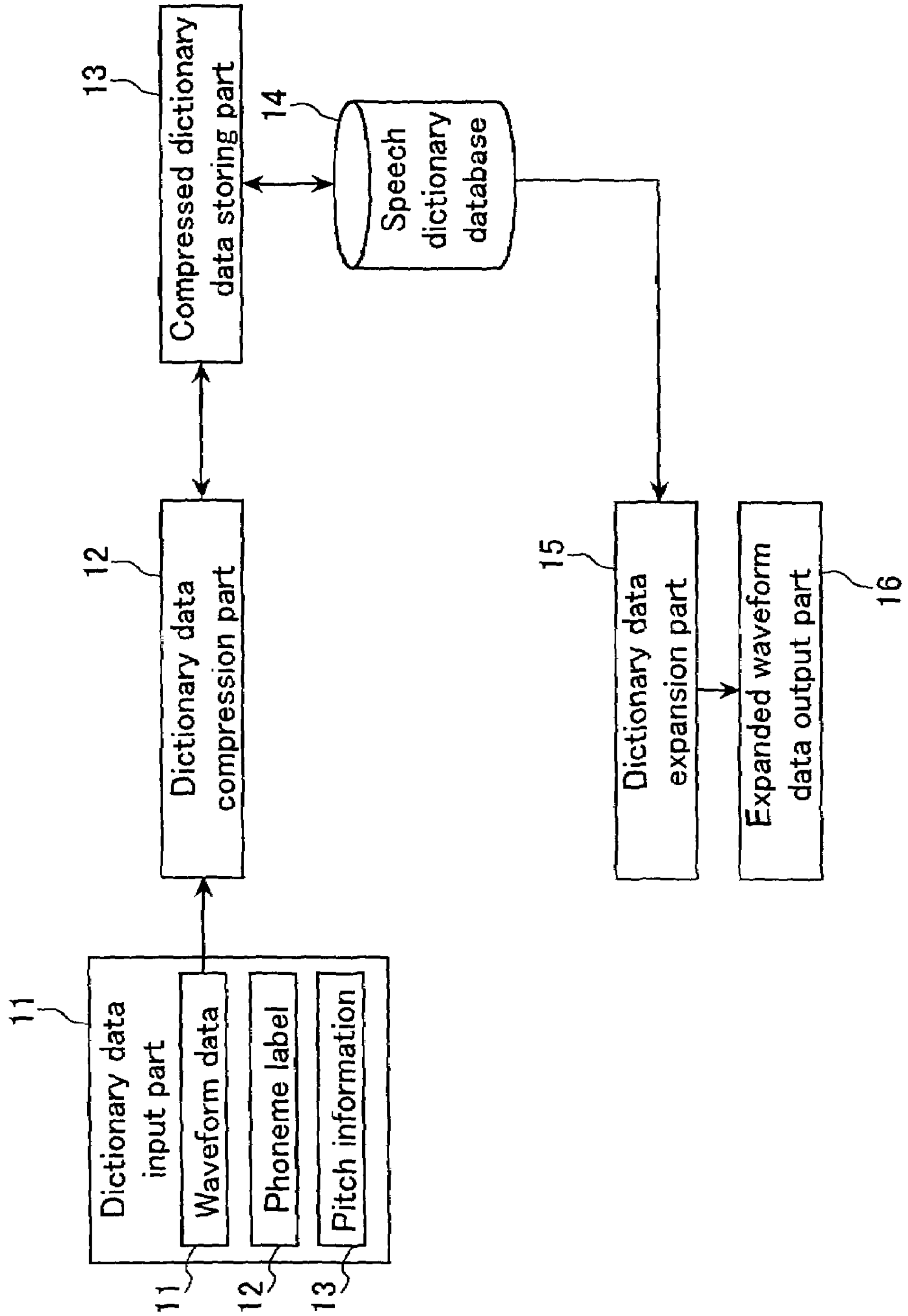
FIG. 1 is a block diagram of a conventional speech data compression/expansion apparatus.

As shown in FIG. 2, dictionary data is composed of waveform data 111, a phoneme label 112, and pitch information 113, in the same way as in the conventional example shown in FIG. 1. In the present embodiment, only the waveform data 111 is compressed and expanded in the same way as in the conventional compression/expansion apparatus. However, all the waveform data 111 is not compressed. A section to be compressed (i.e., a starting point and an ending point for compression) is set, and only the section is compressed. Thus, in the dictionary data compression part 12, the phoneme label 112 and the pitch information 113, as well as the input waveform data 111, are stored as information required for determining a compression position in the speech dictionary database 14 by the compressed dictionary data storing part 21.

Figures 3A, 3B, 3C:
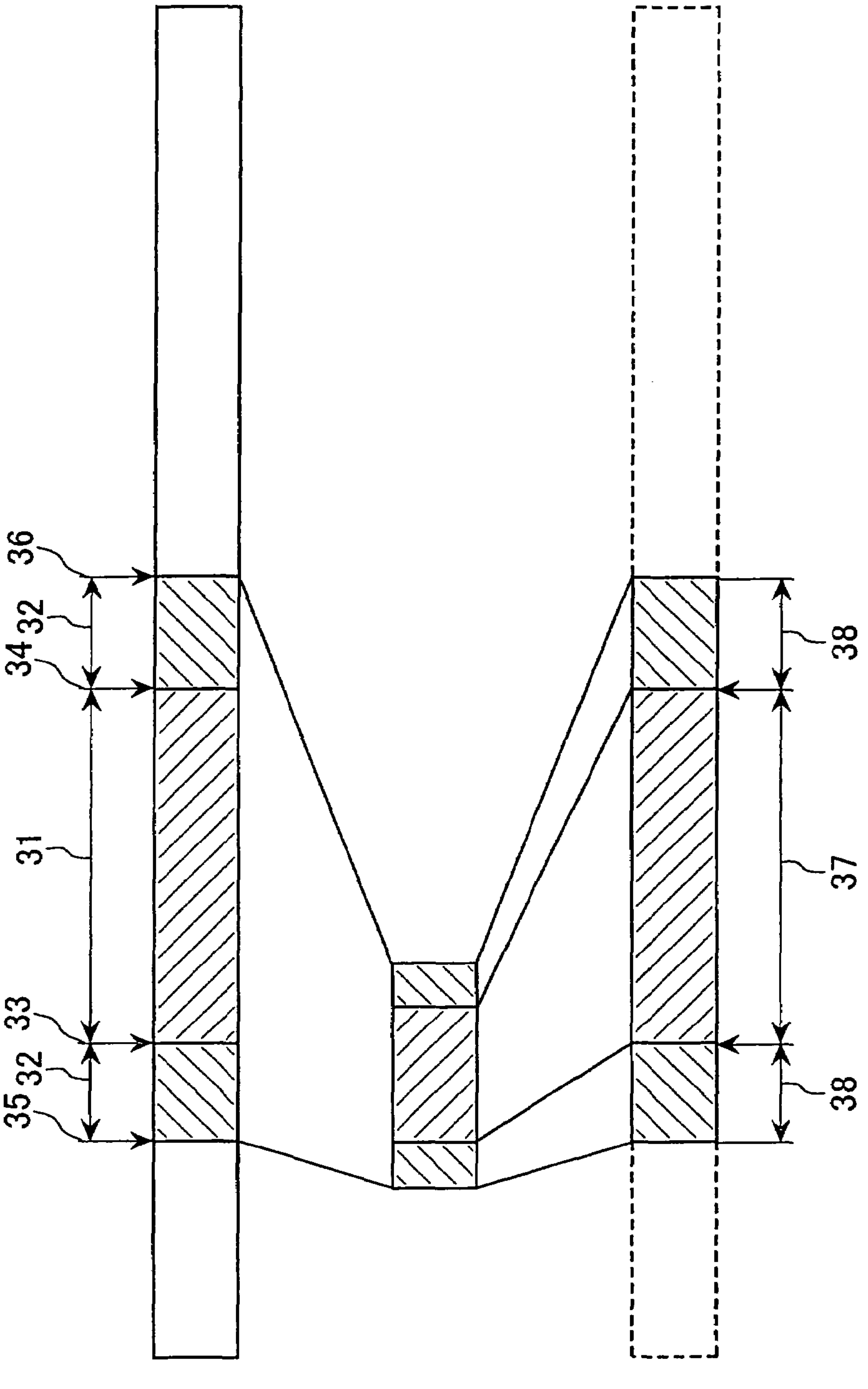
FIG. 3 is a block diagram showing an example of a speech data compression/expansion apparatus in the present embodiment.

Various methods for determining a compression position are considered. First, it is considered that expansion is performed while a starting point and an ending point for compression is being changed, and a section having the highest SNR in a phoneme or syllable unit, based on an SNR measured in each case, is determined as a compression interval. In this case, a compression position cannot be determined at a time, and is determined by the processing in the compression position determining part 22 as shown in FIG. 3. FIG. 3 illustrates an idea of waveform data compression in the speech data compression/expansion apparatus in the present embodiment. In FIG. 3, reference numeral 31 denotes waveform data to be compressed and 32 denotes additional data placed before and after the waveform data 31 to be compressed.

Referring to FIG. 3, in (a) showing the entire original waveform data, a starting point 33 and an ending point 34 of the waveform data 31 used for speech synthesis are determined. If the waveform data 31 is compressed as it is, it is difficult to maintain a high SNR in a rising portion of a speech during expansion. Therefore, a starting point and an ending point during compression are provisionally set before and after the waveform data 31 to be compressed. More specifically, the additional data 32 having an appropriate data length are included before and after the waveform data 31 used for speech synthesis, whereby a starting point 35 for compression and an ending point 36 for compression are provisionally set. A data length of the additional data 32 may be determined in a frame unit, or a sample unit or a pitch unit of a corpus, etc.

As represented by (b), the waveform data 31 is compressed together with the additional data 32, and the waveform data 31 is expanded in the dictionary data expansion part 15 as represented by (c). The expanded waveform data 31 used for speech synthesis can be obtained, maintaining a high SNR, whereas a leading point of the additional data 32 has a low SNR due to the influence of noise. Thus, by deleting the additional data 32 while leaving a waveform data section 37 used for speech synthesis, expanded waveform data with a high SNR can be obtained.

In the expansion position determining part 23, the starting point and the ending point of a part used for speech synthesis in the resultant expanded waveform data are matched with the starting point and the ending point of a section to be expanded. In the SNR calculating part 24, an SNR between the expanded waveform data and the original waveform data is calculated, and the calculated result is sent to the compression position determining part 22.

In the compression position determining part 22, the above-mentioned processing is repeated while the starting point and the ending point during compression are being changed to obtain the calculated results of an SNR, and a compression position with the highest SNR among the calculated results of an SNR is obtained to be stored as compression position information 144.

A method for determining an ending point of a compression interval in a frame unit is also considered. In this case, in the compression position determining part 22, an ending point of a compression interval is determined, based on a frame unit in the dictionary data compression part 12.

Furthermore, a method for deleting a silence interval from the original data to leave only a speech interval, and determining the speech interval as a compression interval is considered. In this case, in the compression position determining part 22, the silence interval is extracted and deleted from the phoneme label 112 and the pitch information 113, and the speech interval is determined as a compression interval.

Furthermore, in order to exclude provisional setting of a compression position, the following methods are also considered: a method for compressing waveform data in a unit of the original data (i.e., in the case where waveform data is obtained in a corpus unit, the data is compressed in a corpus unit); a method for partitioning waveform data at an equal interval; a method in which a starting point of a compression interval is set several pitches before the part used for speech synthesis, based on the phoneme label 112 and the pitch information 113 of dictionary data; and the like.

According to these methods, a compression position can be determined at a time in the compression position determining part 22. Therefore, a starting point and an ending point of a compression position determined in the compression position determining part 22 are stored in the speech dictionary database 14 as compressed waveform data 141.

In the case where the waveform data used for speech synthesis is a part of the compressed waveform data, a section during expansion is determined in the expansion position determining part 23 and stored as expansion position information 145.

Herein, roughly three methods for determining an expansion position can be considered as follows: a method in which expansion is conducted while a starting point and an ending point of an expansion interval are being changed, and an interval with the highest SNR in a phoneme or syllable unit, based on an SNR measured in each case, is determined as an expansion interval; a method in which a starting point during expansion is automatically set several pitches before the part used for speech synthesis, based on the phoneme label and the pitch information; and a method in which an ending point of an expansion interval is automatically calculated based on the number of bytes for bit filling found from the expansion results and the starting position, thereby obtaining an expansion interval.

Figures 4A, 4B, 4C:
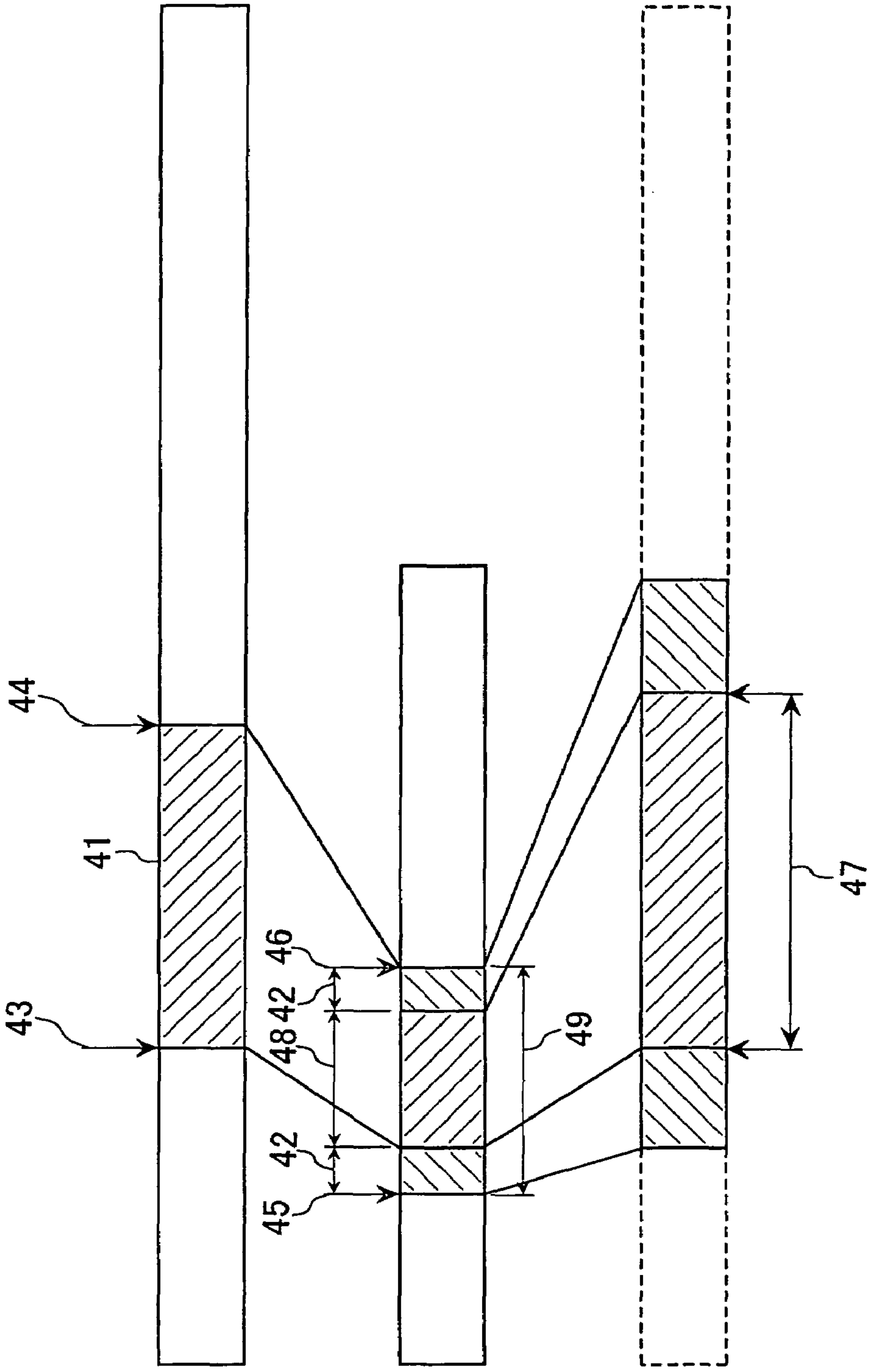
FIG. 4 is a block diagram showing another example of a speech data compression/expansion apparatus in the present embodiment.

First, according to the method in which expansion is conducted while a starting point and an ending point of an expansion interval are being changed, and an interval with the highest SNR in a phoneme or syllable unit, based on an SNR measured in each case, is determined as an expansion interval, an expansion position cannot be confirmed at a time, and is determined by conducting the processing in the expansion position determining part 23 as shown in FIG. 4. FIG. 4 illustrates an idea of waveform data expansion in the speech data compression/expansion apparatus in the present embodiment. In FIG. 4, reference numeral 41 denotes waveform data to be compressed and 42 denotes additional data placed before and after the compressed waveform data.

In FIG. 4, the waveform data used for speech synthesis is registered in the speech dictionary database 14 in a compressed state as represented by (b). If such compressed waveform data is expanded as it is, the entire original waveform data becomes as represented by (a). Therefore, there is a high possibility that a starting point 43 and an ending point 44 of the waveform data 41 used for speech synthesis will have a low SNR during expansion.

In order to prevent waveform data used for speech synthesis from picking up noise during expansion, additional data 42 having an appropriate data length is added before and after compressed waveform data 48, and a starting point 45 for expansion and an ending point 46 for expansion are provisionally set. A data length of such additional data may be determined in a frame unit, or in a sample unit or a pitch unit of a corpus, etc.

Compressed data 49 is expanded in the dictionary data expansion part 15 as represented by (c) in FIG. 4. The expanded waveform data 47 used for speech synthesis can be obtained, maintaining a high SNR, whereas a leading point of the additional data 42 has a low SNR due to the influence of noise. Thus, by deleting the additional data while leaving a waveform data section 47 used for speech synthesis, expanded waveform data with a high SNR can be obtained.

In the expansion position determining part 23, the starting point and the ending point of the port used for speech synthesis in the resultant expanded waveform data are matched with the starting point and the ending point of a section to be expanded, and in the SNR calculating part 24, an SNR between the expanded waveform data and the original waveform data is calculated, and the calculated results are sent to the expansion position determining part 23.

In the expansion position determining part 23, calculated results of an SNR are obtained while changing a starting point and an ending point during expansion, whereby an expansion position with the highest SNR is obtained and stored as expansion position information.

According to the method for automatically setting a starting point during expansion several pitches before the part used for speech synthesis, based on the phoneme label and the pitch information, an expansion position can be determined at a time in the expansion position determining part 23.

Furthermore, according to the method for automatically calculating an ending point based on the number of bytes for bit filling found from the compression results and the starting position, thereby obtaining an expansion interval, in the expansion position determining part 23, an ending point is automatically calculated based on the number of bytes for bit filling and the starting point during expansion, and the interval thus obtained is determined as an expansion interval and stored as expansion position information.

Furthermore, the compressed waveform data stored in the speech dictionary database 14 is expanded in the dictionary data expansion part 15 during speech synthesis, and reproduced in the expanded waveform data output part 16.

Figure 5:
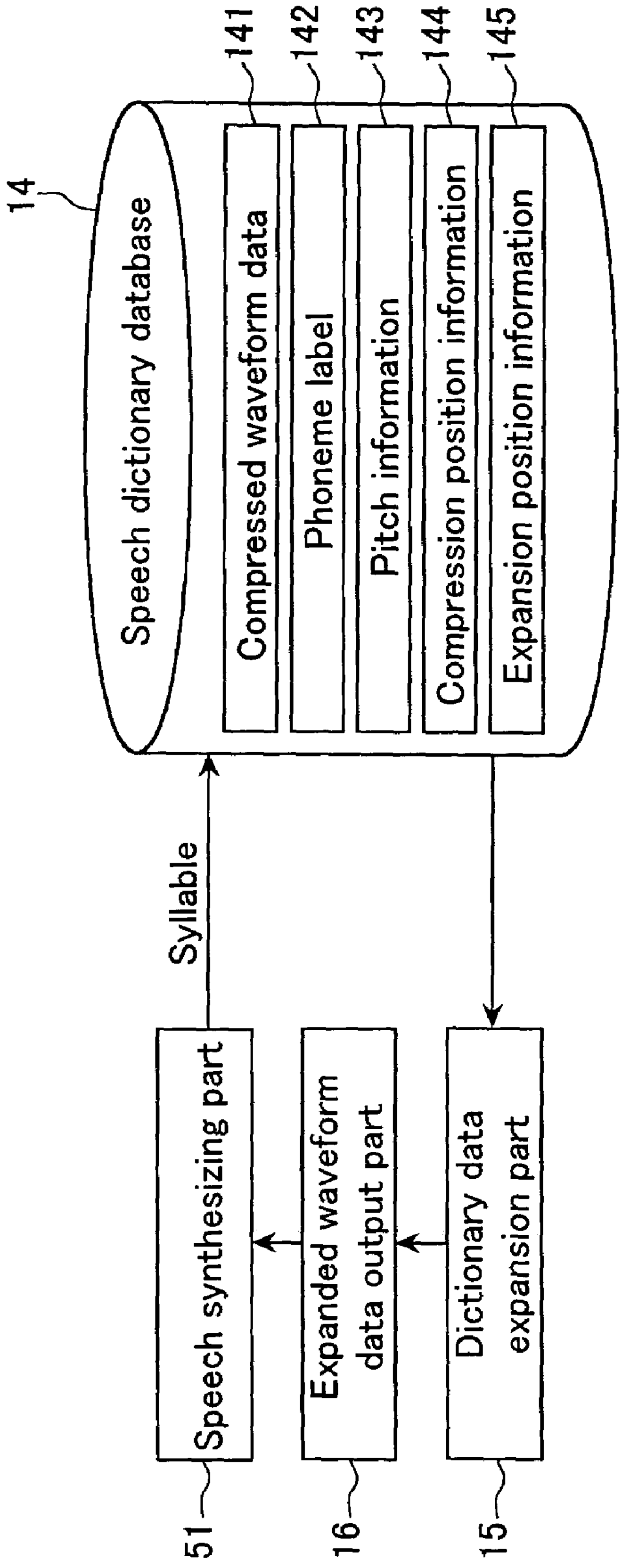
FIG. 5 is a block diagram illustrating speech synthesis in a speech data compression/expansion apparatus in an embodiment of the present invention.

Specifically, as shown in FIG. 5, a speech synthesizing part 51 is provided, whereby a synthesized speech can be reproduced on a syllable basis. This will be described in more detail below.

Figure 6:
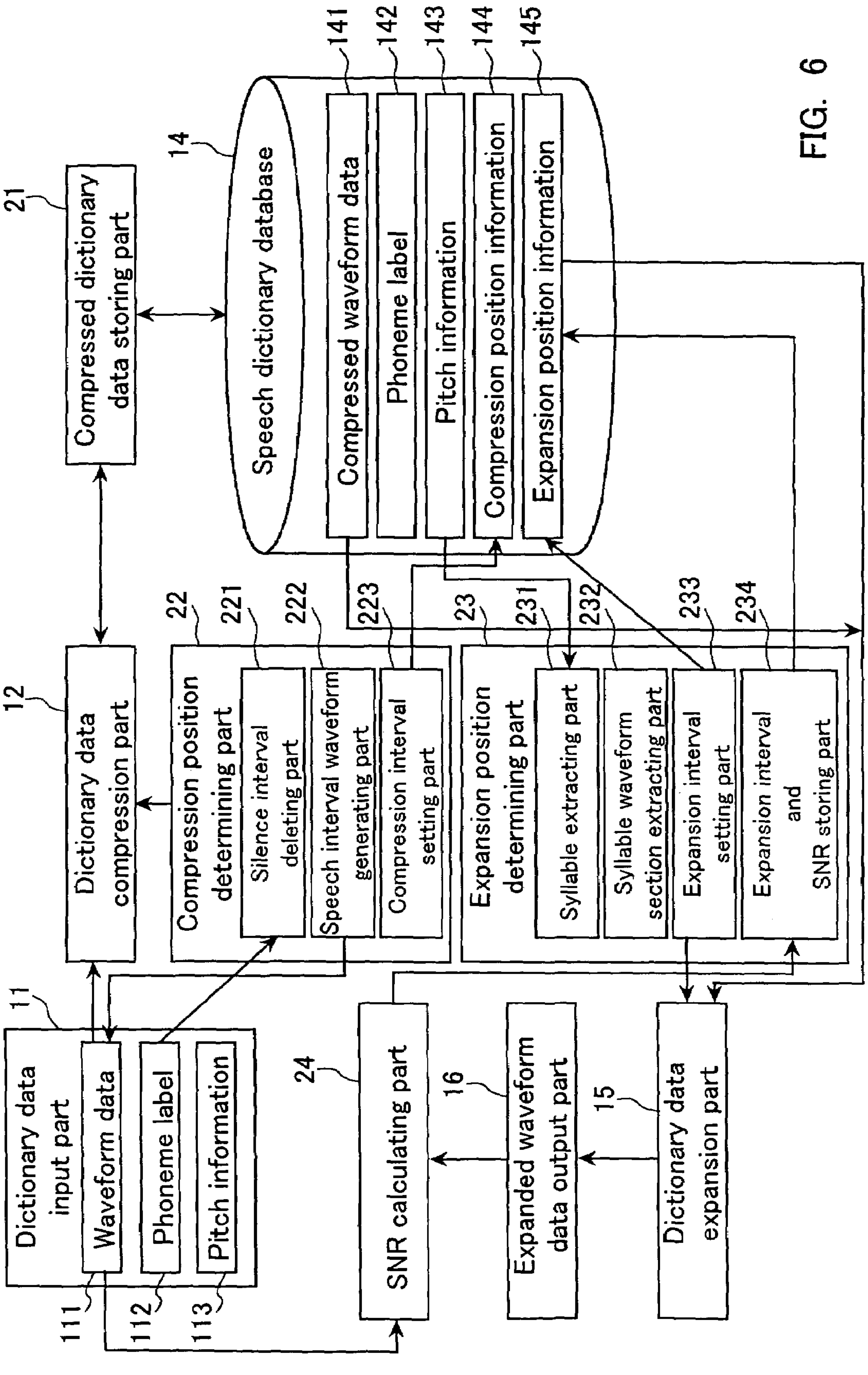
FIG. 6 is a block diagram showing an example of a speech data compression/expansion apparatus of the present invention.

FIG. 6 is a block diagram showing an example of a speech data compression/expansion apparatus of the present invention. First, the compression position determining part 22 and the expansion position determining part 23 are constituted as shown in FIG. 6. More specifically, in the compression position determining part 22, reference numeral 221 denotes a silence interval deleting part, 222 denotes a speech interval waveform generating part, and 223 denotes a compression interval setting part. In the expansion position determining part 23, reference numeral 231 denotes a syllable extracting part, 232 denotes a syllable waveform section extracting part, 233 denotes an expansion interval setting part, and 234 denotes an expansion interval and SNR storing part.

First, it is assumed that waveform data of a corpus "I am keeping dogs" is stored in the speech dictionary database 14. A silence interval of the waveform data 111 is extracted and deleted, based on the phoneme label 112 and the pitch information 113 in the silence interval deleting part 221. Then, a waveform only composed of a speech part is generated in the speech interval waveform generating part 222, and stored as waveform data 111.

In the compression interval setting part 223, the entire speech interval from the beginning to the end of the corpus is specified, and the starting point and the ending point thereof are stored as the compression position information 144. The waveform data of the speech part in the corpus "I am keeping dogs" is compressed, and the result is stored as the compressed waveform data 141.

In the dictionary data compression part 12, the waveform data of the speech part in the corpus "I am keeping dogs" is compressed, and the result is stored as the compressed waveform data 141. A new phoneme label and pitch information regarding the stored compressed waveform data are also stored in the speech dictionary database 14 as phoneme label 142 and the pitch information 143.

Furthermore, in setting an expansion interval, syllable parts of the corpus "I am keeping dogs" is extracted in the phoneme extracting part 231. More specifically, four syllable parts: "I", "am", "keeping", and "dogs" are extracted.

Then, regarding each of the extracted syllables, a starting point and an ending point in the waveform data 111 before compression are detected for each syllable in the syllable waveform section extracting part 232. In the expansion interval setting part 233, a starting point and an ending point in the compressed waveform data 141 are provisionally set, based on the starting point and the ending point in the waveform data 111 before compression for each syllable.

Various setting methods are considered as follows: a method in which a starting point or an ending point during expansion are set to be one to several frames before or after the starting point or the ending point in the required waveform data 111 before compression; a method in which a starting point or an ending point during expansion are set to be one to several samples before or after the starting point or the ending point in the required waveform data 111 before compression; a method in which a starting point or an ending point during expansion are set to be one to several pitches before or after the starting point or the ending point in the required waveform data 111 before compression; and the like.

In the dictionary data expansion part 15, the expansion interval provisionally set in the expansion interval setting part 233 is actually expanded, and an SNR is calculated in the SNR calculating part 24 and stored in the expansion interval and SNR storing part 234. Interval data having the highest SNR in the data stored in the expansion interval and SNR storing part 234 is determined as an expansion interval, and the starting point and the ending point of the interval data are stored in the expansion position storing part 145.

In actual expansion, when a syllable to be expanded is input, in the dictionary data expansion part 15, expansion is performed based on the interval data stored in the expansion position storing part 145. Regarding the expanded waveform data, only a required part is cut to be used.

Figure 7:
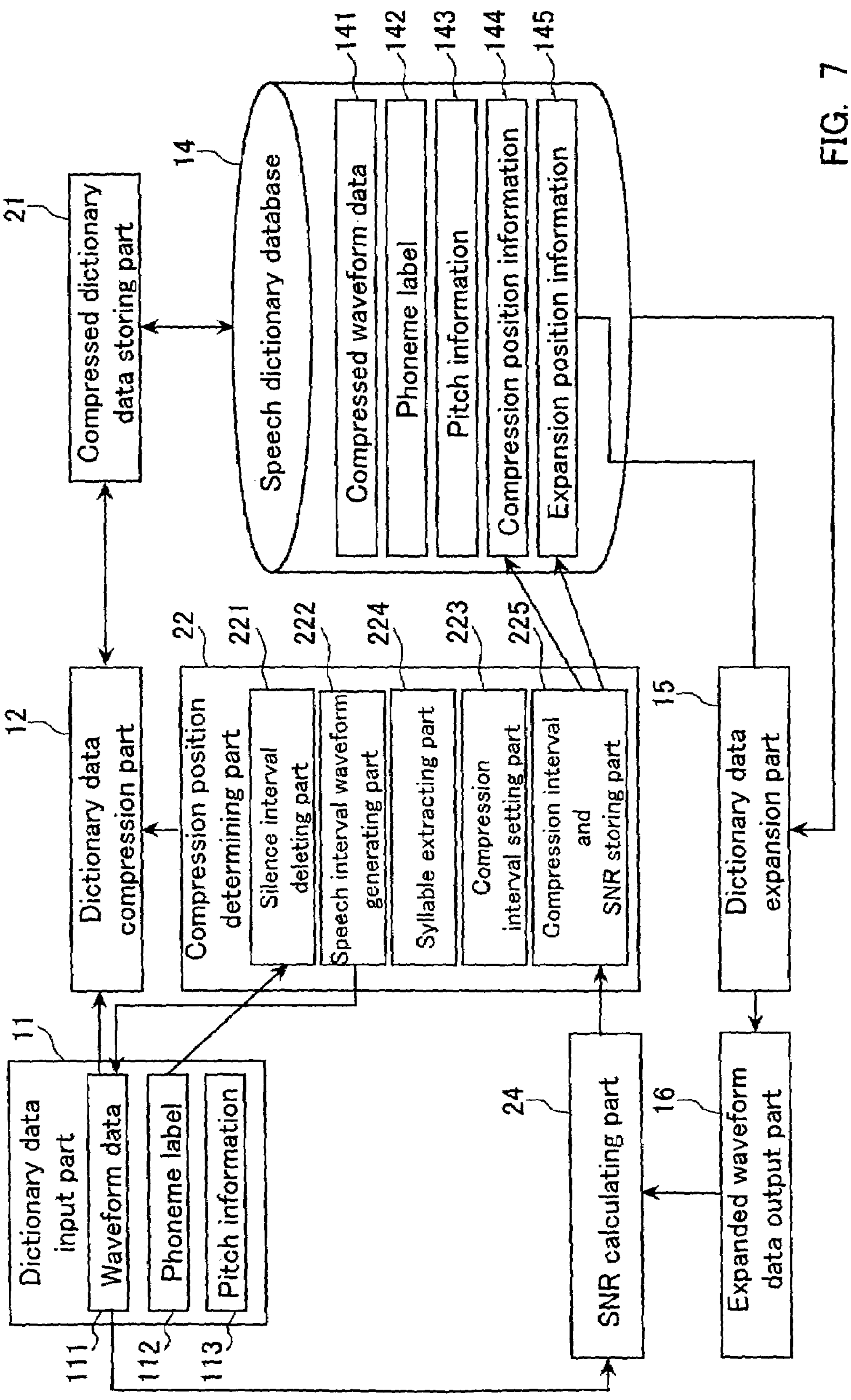
FIG. 7 is a block diagram showing another example of a speech data compression/expansion apparatus of the present invention.

FIG. 7 is a block diagram showing another example of a speech data compression/expansion apparatus of the present invention. The structure of this apparatus is the same as that shown in FIG. 6 except for the structure of the compression position determining part 22. Thus, the description of the expansion position determining part 23 is omitted here. In the compression position determining part 22, reference numeral 224 denotes a syllable extracting part and 225 denotes a compression interval and SNR storing part.

In the same way as in FIG. 6, it is assumed that waveform data of a corpus "I am keeping dogs" is stored in the speech dictionary database 14. In the silence interval deleting part 221, a silence interval of the waveform data 111 is extracted and deleted, based the phoneme label 112 and the pitch information 113. In the speech interval waveform generating part 222, a waveform composed of only a speech part is generated, and stored as waveform data 111.

In the speech extracting part 224, syllable parts in a corpus "I am keeping dogs" are extracted. More specifically, four syllable parts: "I", "am", "keeping", and "dogs" are extracted.

In the compression interval setting part 223, additional data is added before and after the starting point and the ending point of the waveform data before compression in each extracted syllable, for example, "dogs", as shown in FIG. 4, a compression interval is provisionally set, and data in the compression interval is compressed in the dictionary data compression part 12. The compression method thereof is as described above.

The compressed data is once expanded in the dictionary data expansion part 15, and an SNR between the expanded waveform data output from the expanded waveform data output part 16 and the waveform data 111 before compression are calculated in the SNR calculating part 24, and stored in the compression interval and SNR storing part 225 together with the starting point and the ending point of the compression interval.

Among the data stored in the compression interval and SNR storing part 225, the section data with the highest SNR is determined as an expansion interval, and the starting point and the ending point of the section data are stored in the expansion position storing part 145.

In actual expansion, when a syllable to be expanded is input, in the dictionary data expansion part 15, expansion is performed based on the interval data stored in the expansion position storing part 145. Regarding the expanded waveform data, only a required part is cut to be used.

As described above, according to the present embodiment, a compression position and an expansion position in the waveform data can be determined based on the position having the highest SNR in speech synthesis, which enables high quality speech synthesis to be performed.

Furthermore, since the capacity of waveform data to be compressed can be minimized to a required value. Therefore, an expansion time can be shortened, and a real time property of speech synthesis can be ensured.

Figure 8:
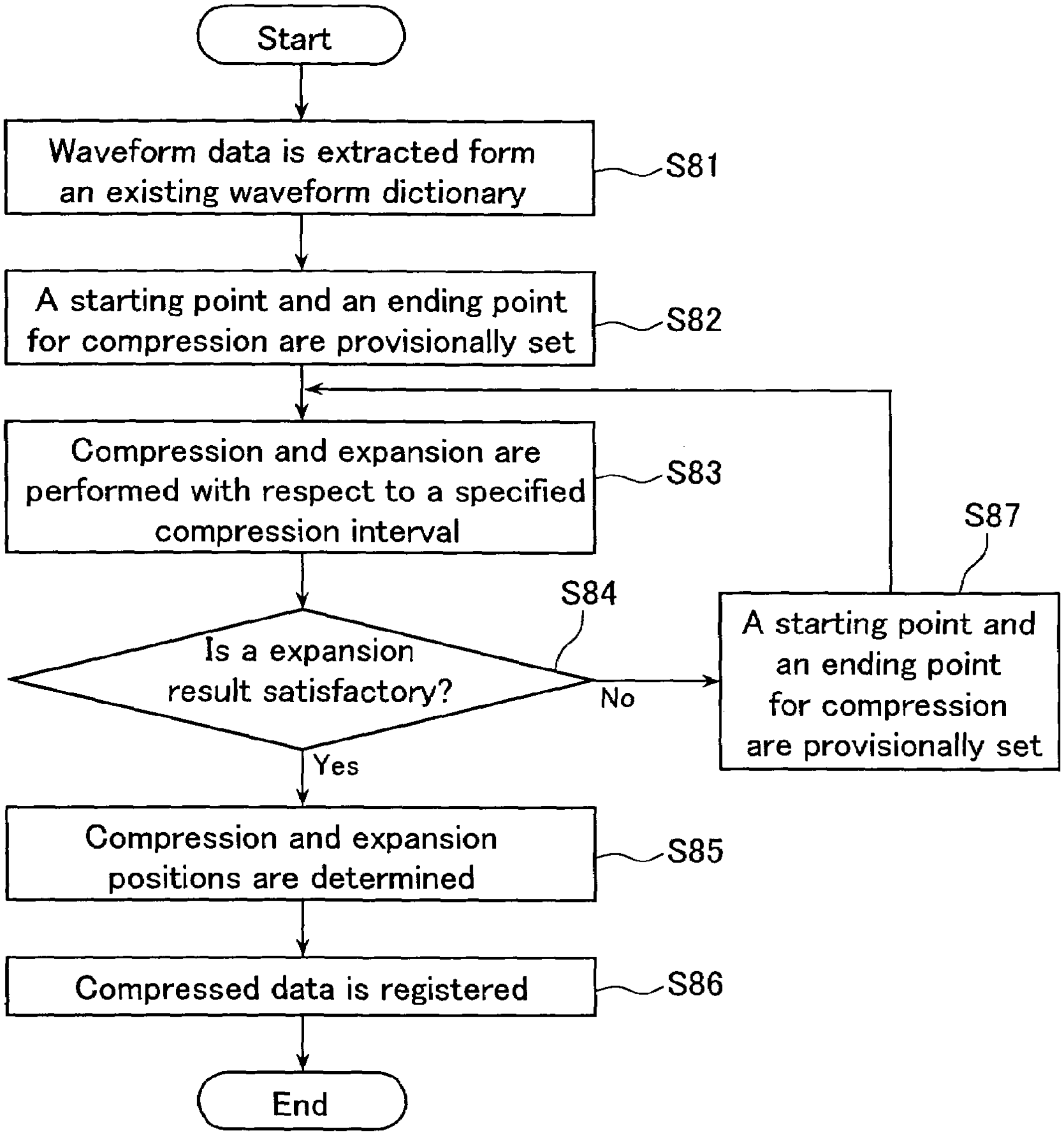
FIG. 8 is a flow chart illustrating the processing in a speech data compression/expansion apparatus in an embodiment of the present invention.

Next, a processing flow of a program realizing a speech data compression/expansion apparatus in the present embodiment will be described. FIG. 8 shows a flow chart illustrating processing of a program realizing a speech data compression/expansion apparatus in the present embodiment.

In FIG. 8, when waveform data is extracted from an existing speech waveform dictionary or the like and input (Operation 81), a part to be used for speech synthesis in the waveform part is specified, and a starting point and an ending point for compression are provisionally set before and after the part to be used for speech synthesis (Operation 82).

Next, the provisionally set compression section is compressed and expanded (Operation 83). If the quality of the expanded waveform data is high (Operation 84: Yes), the provisionally set compression interval is determined as a compression/expansion position (Operation 85) and registered in a database as waveform data used for speech synthesis (Operation 86). If the quality of the expanded waveform data is high (Operation 84: No), the compression position is provisionally set again (Operation 87), and the above-mentioned processing is repeated.

Figure 9:
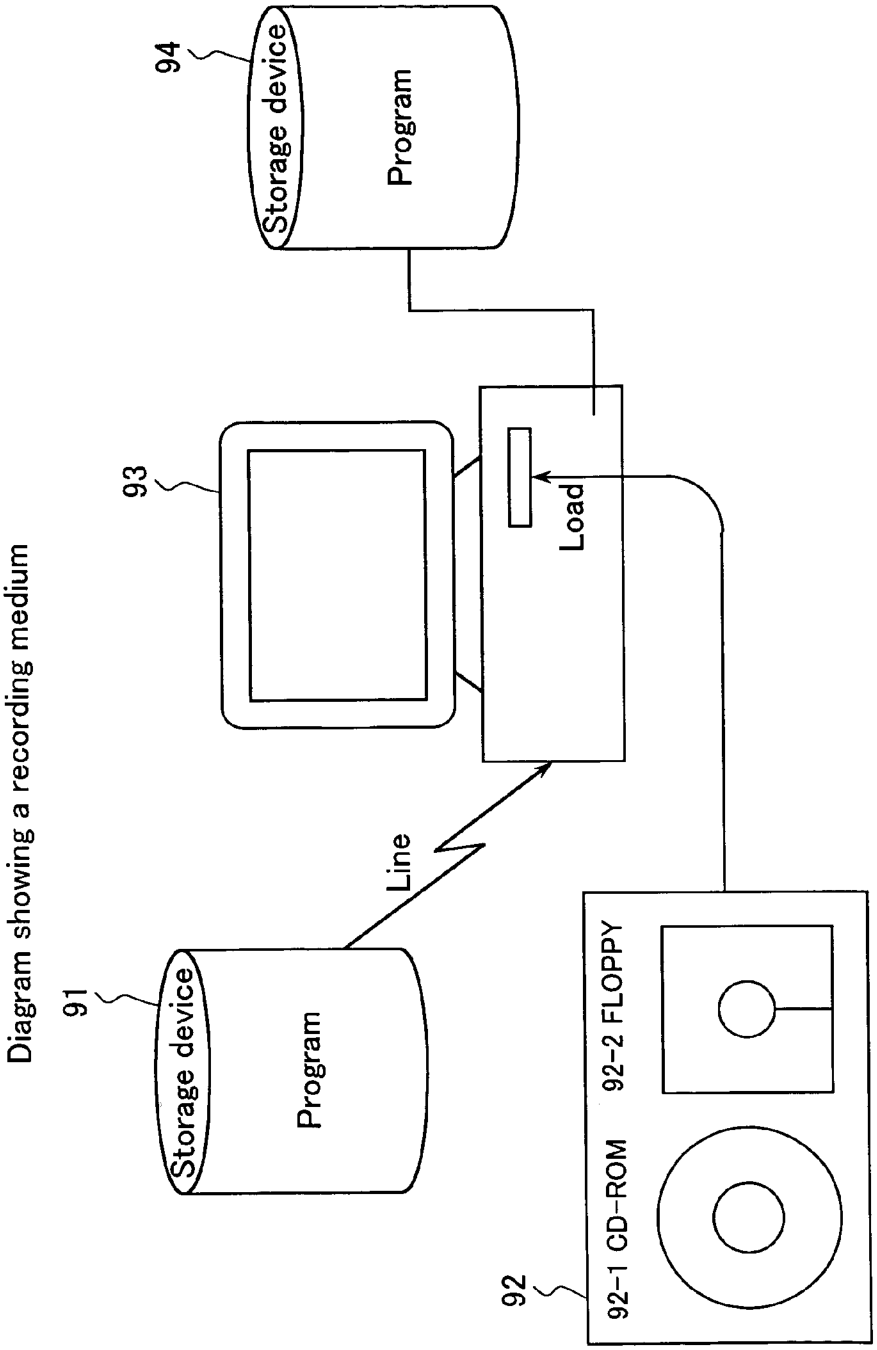
FIG. 9 illustrates a recording medium.

Examples of a recording medium storing a program realizing the speech data compression/expansion apparatus in the present embodiment include not only a portable recording medium 92 such as a CD-ROM 92-1 and a floppy disk 92-2, but also a storage device 91 provided at the end of a communication line and another storage device 94 such as a hard disk and a RAM of a computer 93, as shown in examples of a recording medium in FIG. 9. In execution of the program, the program is loaded and executed on a main memory.

Furthermore, examples of a recording medium storing compressed data and the like generated by the speech data compression/expansion apparatus in the present embodiment include not only a portable recording medium 92 such as a CD-ROM 92-1 and a floppy disk 92-2, but also a storage device 91 provided at the end of a communication line and another storage device 94 such as a hard disk and a RAM of a computer 93, as shown in examples of a recording medium in FIG. 9. For example, the recording medium is read by a computer when the speech data compression/expansion apparatus of the present invention is used.

As described above, according to the speech data compression/expansion apparatus of the present invention, a compression position and an expansion position in waveform data can be determined based on a position having the highest SNR during speech synthesis, which enables high quality speech synthesis to be performed.

Furthermore, according to the speech data compression/expansion apparatus of the present invention, a capacity of waveform data to be compressed can be minimized to a required value; therefore, an expansion time can be shortened and a real time property of speech synthesis can be ensured.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and setting a starting point and an ending point for compression before and after the part;

a dictionary data compression part for compressing the waveform data with respect to a compression interval specified by the starting point and the ending point for compression; and a dictionary data expansion part for expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis.

2. A speech data compression/expansion apparatus according to claim 1, wherein, in the compression position determining part, the part used for speech synthesis in the waveform data is specified, and the starting point and the ending point for compression are provisionally set before and after the part, the apparatus further includes:

a dictionary data compression part for compressing the waveform data with respect to the specified compression interval;

a dictionary data expansion part for expanding the compressed waveform data; and an SNR calculating part for calculating an SNR with respect to the expanded waveform data; and the specified compression interval, having a highest SNR, is determined as a compression/expansion position, and the compressed waveform data is registered in a database as the waveform data used for speech synthesis.

3. A speech data compression/expansion apparatus according to claim 1, further comprising an expansion position determining part for setting a starting point and an ending point for expansion before and after the compressed waveform data registered in a database as the waveform data used for speech synthesis, wherein the waveform data is expanded with respect to an expansion interval specified by the starting point and the ending point for expansion in the dictionary data expansion part.

4. A speech data compression/expansion apparatus according to claim 1, wherein, in the compression position determining part, the starting point and the ending point for compression are determined in a pitch unit.

5. A speech data compression/expansion apparatus according to claim 1, wherein, in the compression position determining part, the starting point and the ending point for compression are determined in a frame unit.

6. A speech data expansion apparatus for expanding the waveform data stored in a database, compressed by the speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and setting a starting point and an ending point for compression before and after the part;

a dictionary data compression part for compressing the waveform data with respect to a compression interval specified by the starting point and the ending point for compression; and a dictionary data expansion part for expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis.

7. A speech data expansion apparatus for expanding the waveform data stored in a database, compressed by the speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and setting a starting point and an ending point for compression before and after the part;

a dictionary data compression part for compressing the waveform data with respect to a compression interval specified by the starting point and the ending point for compression; and a dictionary data expansion part for expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis, and wherein, in the compression position determining part, the starting point and the ending point for compression are determined in a frame unit.

8. A speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and determining a compression position containing the part;

a dictionary data compression part for compressing the waveform data with respect to the compression position;

an expansion position determining part for setting a starting point and an ending point for expansion before and after the compressed waveform data; and a dictionary data expansion part for expanding the compressed waveform data with respect to an expansion interval specified by the starting point and the ending point for expansion, wherein the specified expansion interval, in which an expansion result of the compressed waveform data has highest quality, is determined as an expansion position, and the compressed waveform data, and the starting point and the ending point for expansion are registered in a database as the waveform data used for speech synthesis.

9. A speech data compression/expansion apparatus according to claim 8, wherein, in the expansion position determining part, the starting point and the ending point for expansion are provisionally set before and after the compressed waveform data, the apparatus further includes:

a dictionary data expansion part for expanding the compressed waveform data with respect to the specified expansion interval; and an SNR calculating part for calculating an SNR with respect to the expanded waveform data, wherein the specified expansion interval, having a highest SNR, is determined as an expansion position.

10. A speech data compression/expansion apparatus according to claim 8, wherein, in the expansion position determining part, the starting point and the ending point for expansion are determined in a pitch unit.

11. A speech data compression/expansion apparatus according to claim 8, wherein, in the expansion position determining part, the ending point for expansion is determined based on the number of bytes for bit filling and the starting point.

12. A speech data expansion apparatus for expanding the waveform data stored in a database, in which the expansion interval is determined by the speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and determining a compression position containing the part;

a dictionary data compression part for compressing the waveform data with respect to the compression position;

an expansion position determining part for setting a starting point and an ending point for expansion before and after the compressed waveform data; and a dictionary data expansion part for expanding the compressed waveform data with respect to an expansion interval specified by the starting point and the ending point for expansion, wherein the specified expansion interval, in which an expansion result of the compressed waveform data has highest quality, is determined as an expansion position, and the compressed waveform data, and the starting point and the ending point for expansion are registered in a database as the waveform data used for speech synthesis.

13. A speech data compression/expansion method, comprising:

extracting speech data containing waveform data from an existing speech waveform dictionary and inputting the extracted speech data;

specifying a part used for speech synthesis in the waveform data, and setting a starting point and an ending point for compression before and after the part;

compressing the waveform data with respect to a compression interval specified by the starting point and the ending point for compression; and expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis.

14. A speech data compression/expansion method, comprising:

extracting speech data containing waveform data from an existing speech waveform dictionary and inputting the extracted speech data;

specifying a part used for speech synthesis in the waveform data, and determining a compression interval including the part;

compressing the waveform data with respect to the compression interval;

setting a starting point and an ending point for expansion before and after the compressed waveform data; and expanding the compressed waveform data with respect to an expansion interval specified by the starting point and the ending point for expansion, wherein the specified expansion interval, in which an expansion result of the compressed waveform data has highest quality, is determined as an expansion position, and the compressed waveform data, and the starting point and the ending point for expansion are registered in a database as the waveform data used for speech synthesis.

15. A speech data expansion system for expanding the waveform data stored in a database, compressed by the speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and setting a starting point and an ending point for compression before and after the part;

a dictionary data compression part for compressing the waveform data with respect to a compression interval specified by the starting point and the ending point for compression; and a dictionary data expansion part for expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis.

16. A speech data expansion system for expanding the waveform data stored in a database, compressed by the speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and setting a starting point and an ending point for compression before and after the part;

a dictionary data compression part for compressing the waveform data with respect to a compression interval specified by the starting point and the ending point for compression; and a dictionary data expansion part for expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis, and wherein, in the compression position determining part, the starting point and the ending point for compression are determined in a frame unit.

17. A speech data expansion system for expanding the waveform data stored in a database, in which the expansion interval is determined by the speech data compression/expansion apparatus, comprising:

a dictionary data input part for extracting speech data containing waveform data from an existing speech waveform dictionary and inputting the extracted speech data;

a compression position determining part for specifying a part used for speech synthesis in the waveform data, and determining a compression position containing the part;

a dictionary data compression part for compressing the waveform data with respect to the compression position;

an expansion position determining part for setting a starting point and an ending point for expansion before and after the compressed waveform data; and a dictionary data expansion part for expanding the compressed waveform data with respect to an expansion interval specified by the starting point and the ending point for expansion, wherein the specified expansion interval, in which an expansion result of the compressed waveform data has highest quality, is determined as an expansion position, and the compressed waveform data, and the starting point and the ending point for expansion are registered in a database as the waveform data used for speech synthesis.

18. A computer-readable recording medium storing a program to be executed by a computer, the program comprising:

extracting speech data containing waveform data from an existing speech waveform dictionary and inputting the extracted speech data;

specifying a part used for speech synthesis in the waveform data, and setting a starting point and an ending point for compression before and after the part;

compressing the waveform data with respect to a compression interval specified by the starting point and the ending point for compression; and expanding the compressed waveform data, wherein the specified compression interval, in which an expansion result of the compressed waveform data has highest quality, is determined as a compression/expansion position, and the compressed waveform data, and the starting point and the ending point for compression are registered in a database as the waveform data used for speech synthesis.

19. A computer-readable recording medium storing a program to be executed by a computer, the program comprising:

extracting speech data containing waveform data from an existing speech waveform dictionary and inputting the extracted speech data;

specifying a part used for speech synthesis in the waveform data, and determining a compression interval including the part;

compressing the waveform data with respect to the compression interval;

setting a starting point and an ending point for expansion before and after the compressed waveform data; and expanding the compressed waveform data with respect to an expansion interval specified by the starting point and the ending point for expansion, wherein the specified compression interval, in which an expansion result of the compressed waveform data has highest quality, is determined as an expansion position, and the compressed waveform data, and the starting point and the ending point for expansion are registered in a database as the waveform data used for speech synthesis.

* * * * *

UNITED STATES PATENT AND TRADEMARK OFFICE

CERTIFICATE OF CORRECTION

PATENT NO. : 6,928,408 B1
DATED : August 9, 2005
INVENTOR(S) : Matsumoto

It is certified that error appears in the above-identified patent and that said Letters Patent is hereby corrected as shown below:

Column 12,
Line 38, change “data;” to -- data, --.

Signed and Sealed this

Eleventh Day of April, 2006

JON W. DUDAS
*Director of the United States Patent and Trademark Office*